United States Patent
Zagone et al.

(10) Patent No.: US 9,611,751 B1
(45) Date of Patent: Apr. 4, 2017

(54) GEOMETRY FOR INCREASING TORQUE CAPACITY OF RIVETED VANE LEVER

(71) Applicant: BorgWarner Inc., Auburn Hills, MI (US)

(72) Inventors: John Zagone, Hendersonville, NC (US); Eli Morgan, Leicester, NC (US); Greg Williams, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/858,223

(22) Filed: Sep. 18, 2015

(51) Int. Cl.
| F04D 29/044 | (2006.01) |
| F01D 17/16 | (2006.01) |
| F01D 9/04 | (2006.01) |

(52) U.S. Cl.
CPC ............. *F01D 17/16* (2013.01); *F01D 9/041* (2013.01); *F05D 2220/40* (2013.01); *F05D 2230/60* (2013.01); *F05D 2240/12* (2013.01)

(58) Field of Classification Search
CPC ..... F01D 17/16; F01D 17/165; F05D 2220/32
USPC .................................. 415/160, 163; 416/160
See application file for complete search history.

(56) References Cited

U.S. PATENT DOCUMENTS

| 4,979,874 A * | 12/1990 | Myers ...................... F01D 7/00 415/160 |
| 5,092,723 A * | 3/1992 | Compton ................. B21J 15/12 411/120 |
| 5,492,446 A * | 2/1996 | Hawkins ................ F01D 17/162 411/116 |
| 5,690,459 A * | 11/1997 | Donovan .............. F16B 17/006 29/509 |
| 6,019,574 A * | 2/2000 | DiBella ................. F01D 17/162 415/148 |
| 6,699,010 B2 * | 3/2004 | Jinnai ..................... F01D 17/16 29/889.22 |
| 7,223,066 B2 * | 5/2007 | Rockley ................ F01D 17/162 415/160 |
| 7,815,390 B2 * | 10/2010 | Schmelz ................. B60R 11/00 403/337 |
| 7,886,536 B2 * | 2/2011 | Hemer .................. F01D 17/165 415/159 |
| 8,104,280 B2 * | 1/2012 | Akita .................... B21C 23/001 29/889.7 |
| 8,668,443 B2 | 3/2014 | Espasa et al. |
| 2009/0074569 A1 * | 3/2009 | Garcin .................... F01D 17/16 415/148 |
| 2010/0260597 A1 | 10/2010 | Sausse et al. |

FOREIGN PATENT DOCUMENTS

| KR | 20110108206 A | 10/2011 |
| WO | 2013163018 A1 | 10/2013 |

* cited by examiner

*Primary Examiner* — John K Fristoe, Jr.
*Assistant Examiner* — Jason Fountain
(74) *Attorney, Agent, or Firm* — BrooksGroup

(57) ABSTRACT

A number of variations may include a product comprising: a vane lever comprising a first end; a second end; a top surface; and a bottom surface; and an opening defined by an inner surface which extends through the top surface and the bottom surface of the second end, and wherein at least a portion of the inner surface comprises a non-cylindrical, multi-lobed shape.

16 Claims, 5 Drawing Sheets

US 9,611,751 B1

GEOMETRY FOR INCREASING TORQUE CAPACITY OF RIVETED VANE LEVER

TECHNICAL FIELD

The field to which the disclosure generally relates to includes vane levers and vane shafts for a turbine.

BACKGROUND

A turbocharger may include variable turbine geometry using vanes in front of a turbine wheel.

SUMMARY OF ILLUSTRATIVE VARIATIONS

A number of variations may include a product comprising: a vane lever comprising a first end; a second end; a top surface; and a bottom surface; and an opening defined by an inner surface which extends through the top surface and the bottom surface of the second end, and wherein at least a portion of the inner surface comprises a non-cylindrical, multi-lobed shape.

A number of variations may include a vane pack assembly comprising: an upper vane ring; a lower vane ring; a plurality of vane components each having a vane shaft and a vane interposed between the upper vane ring and the lower vane ring; an adjustment ring surrounding a portion of the upper vane ring having a plurality of openings; and a plurality of vane levers each having a non-cylindrical, multi-lobed opening defined by an inner surface at a second end of the vane lever, wherein the non-cylindrical, multi-lobed opening surrounds a portion of the vane shaft and wherein the first end of the vane lever attaches to the adjustment ring.

A number of variations may include a method of joining a vane lever and a vane shaft of a vane pack assembly together comprising: providing a vane lever having a non-cylindrical, multi-lobed opening defined by an inner surface; fitting the vane lever onto a vane shaft; and riveting the vane shaft to the vane lever.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 14:
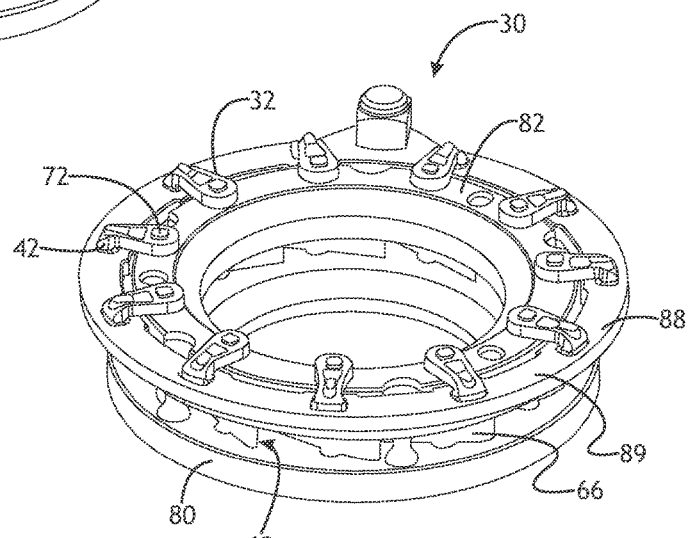
FIG. 14 illustrates a perspective view of a vane pack according to a number of variations.

A variable turbine geometry (VTG) turbocharger may be used to expand the usable flow rate range of an engine while at the same time maintaining a high level of efficiency. A VTG turbocharger may regulate the turbine output by changing the inflow angle and the inflow speed at the turbine inlet. The change in the inflow angle and inflow speed at the turbine inlet may be done using a vane pack assembly 30, a variation of which is illustrated in FIG. 14. As temperatures and aero loads of the VTG turbocharger are increased, the torque transfer capability through the vane levers 32 and the vane shafts 64 of the vane pack assembly 30 may need to be increased. In a number of variations, a cylindrical (or non-cylindrical) vane shaft and non-circular, multi-lobed lever opening may be joined together using a riveting process which may form a high torque capacity joint which may withstand the temperatures and aero loads of the VTG turbocharger, as will be discussed below.

Figure 1:
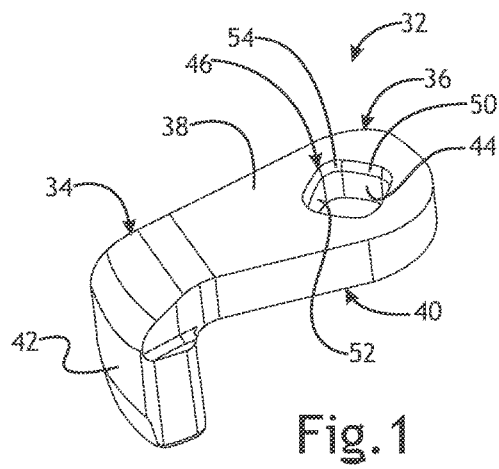
FIG. 1 illustrates a perspective view of a vane lever according to a number of variations.
Figure 2:
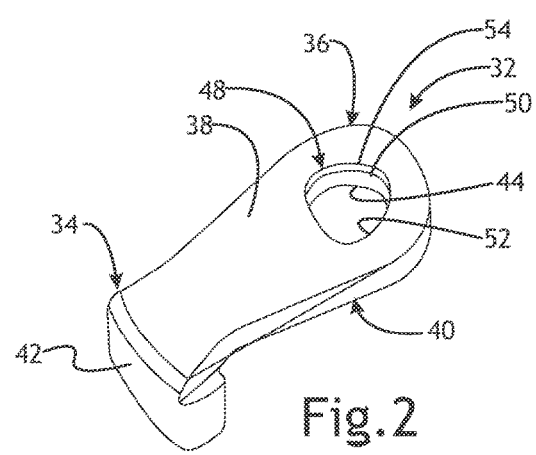
FIG. 2 illustrates a perspective view of a vane lever according to a number of variations.
Figure 3:
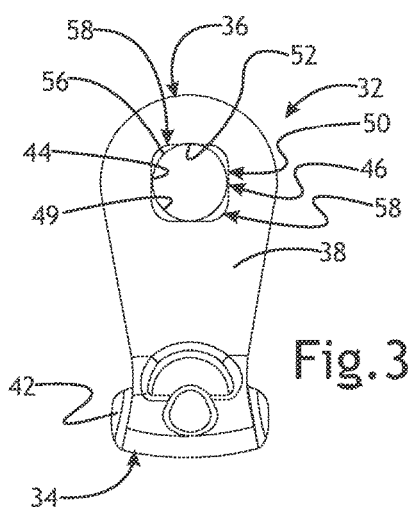
FIG. 3 illustrates a top view of a vane lever according to a number of variations.
Figure 4:
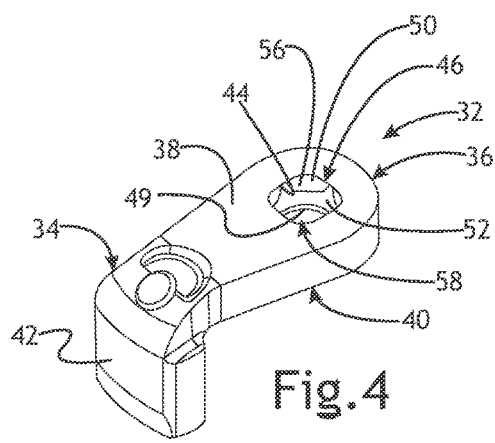
FIG. 4 illustrates a perspective view of a vane lever according to a number of variations.
Figure 5:
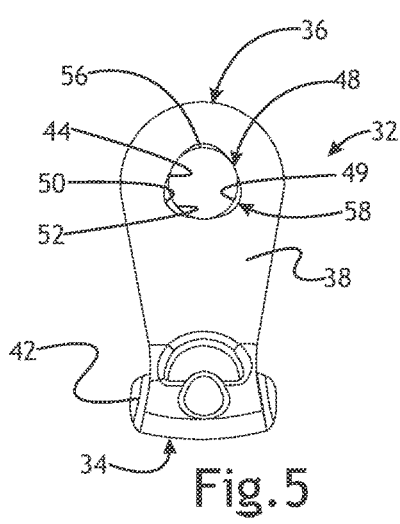
FIG. 5 illustrates a top view of a vane lever according to a number of variations.
Figure 6:
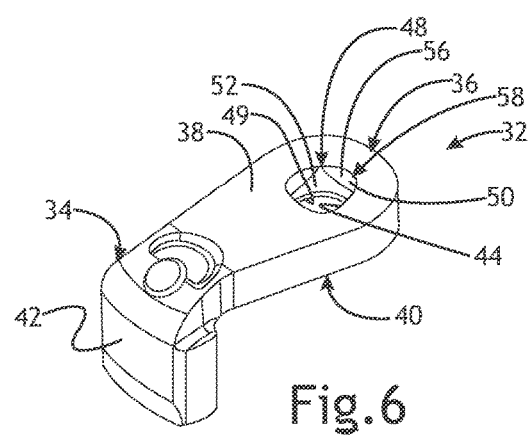
FIG. 6 illustrates a perspective view of a vane lever according to a number of variations.
Figure 7:
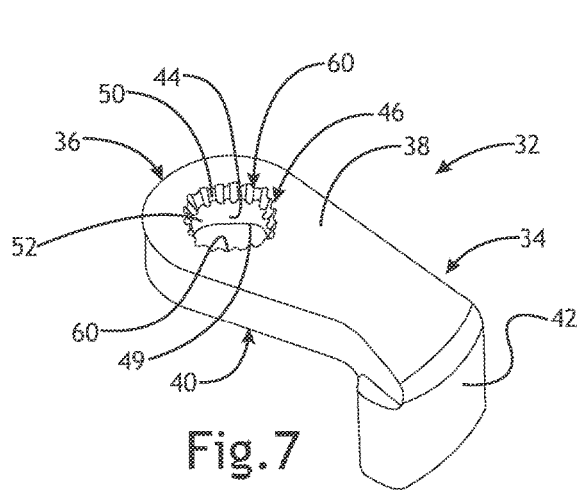
FIG. 7 illustrates a perspective view of vane lever according to a number of variations.
Figure 8:
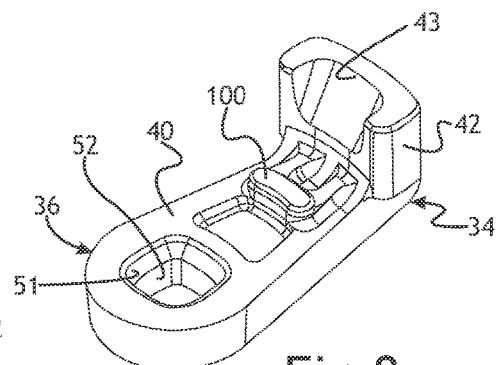
FIG. 8 illustrated a perspective bottom view of a vane lever according to a number of variations.
Figure 9:
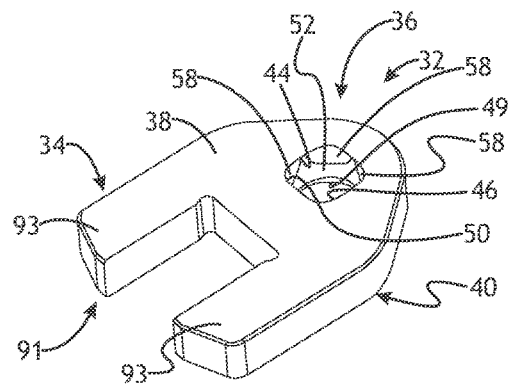
FIG. 9 illustrates a perspective view of a vane lever according to a number of variations.

Referring to FIGS. 1-9, in a number of variations, a vane lever 32 may include a first end 34, a second end 36, a top surface 38, and a bottom surface 40. The vane lever 32 may also include an opening 44 which may extend through the top surface 38 and the bottom surface 40 at the second end 36 of the vane lever 32, and which may be defined by an inner surface 52 of the vane lever 32. The inner surface 52 may be constructed and arranged to accommodate a portion of the outer perimeter of the vane shaft 64. The vane lever opening 44 may be any number of non-cylindrical multi-lobed shapes. In one variation, the vane lever opening 44 may include a four sided multi-lobe interface 46 including, but not limited to, a diamond-like or square shape, through the entire interface from the top surface 38 to the bottom surface 40, a variation of which is illustrated in FIG. 1. In another variation, the vane lever opening 44 may be a three sided multi-lobe interface 48 including, but not limited to, a triangular or trilobe shape, through the entire interface from the top surface 38 to the bottom surface 40, a variation of which is illustrated in FIG. 2. In a number of variations, the vane lever opening 44 may transition from cylindrical 49 at the bottom surface 40 to non-cylindrical shapes 46, 48 described above and hereafter at the top surface 38, variations of which are illustrated in FIGS. 3-7 and 9. In one variation, the vane lever opening 44 may include a four sided multi-lobe interface 46 at the top surface 38, transitioning to a circular interface 49 at the bottom surface 40, variations of which are illustrated in FIGS. 3, 4, and 9. In another variation, the vane lever opening 44 may include a three sided multi-lobe interface 48 on the top surface 38, transitioning to a circular interface 49 at the bottom surface 40, variations of which are illustrated in FIGS. 5 and 6. In another variation, the vane lever opening 44 may include a knurled four sided multi-lobe interface 46 at the top surface 38, transitioning to a circular interface 49 at the bottom surface 40, a variation of which is illustrated in FIG. 7. In one variation, the top edge 50 of the inner surface 52 may be rounded or chamfered 54, variations of which are illustrated in FIGS. 1-2. In another variation, the top edge 50 of the inner surface 52 may include a groove 56 at each of the lobes 58, variations of which are illustrated in FIGS. 3-6 and 9. In yet another variation, the top edge 50 of the inner surface 52 may include a plurality of ridges or grooves 60 which may extend around the perimeter of the top edge 50, a variation of which is illustrated in FIG. 7. Referring to FIG. 8, in a number of variations, the bottom edge 51 of the inner surface 52 may also be rounded or may include a chamfer.

Figure 15:
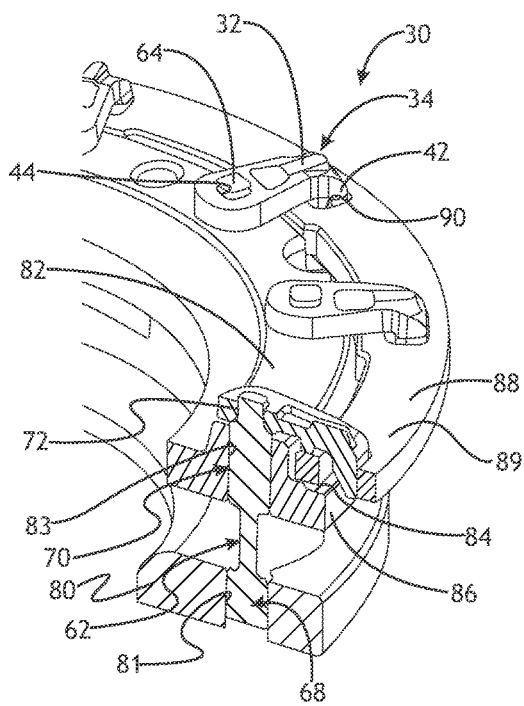
FIG. 15 illustrates a close-up perspective view of a vane pack assembly according to a number of variations.
Figure 19:
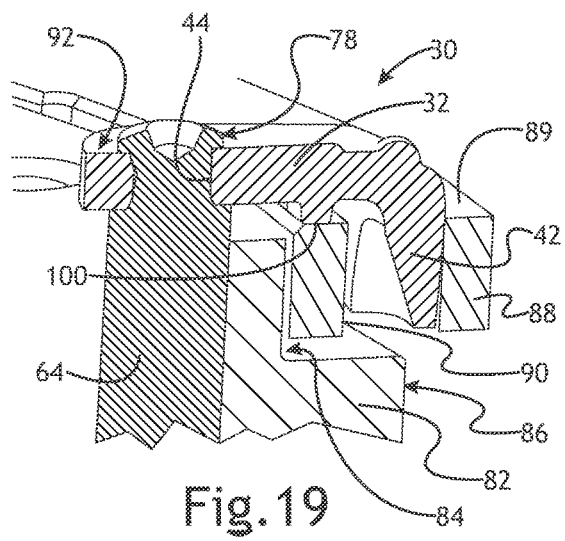
FIG. 19 illustrates a section view of a vane pack assembly according to a number of variations.

Referring to FIGS. 1-8, in one variation, the vane lever 32 may also include a tab 42 which may extend downward from the first end 34 and may be constructed and arranged to mate with an opening/cutout 90 in an adjustment ring 88, as will be discussed hereafter. In a number of variations, the tab 42 may include a cutout or grooved surface 43, a variation of which is illustrated in FIG. 8. The bottom surface 40 may include a standoff 100 which may be located between the first end 34 and the second end 36, a variation of which is also illustrated in FIG. 8. The standoff 100 may be constructed and arranged so that it may sit on the top surface 89 of the adjustment ring 88, variations of which are illustrated in FIGS. 15 and 19.

Referring to FIG. 9, in another variation, the first end 34 of the vane lever 32 may be constructed and arranged as a fork end 91 having a first and second protrusion 93. The fork end 91 of the vane lever 32 may be constructed and arranged to attach to an adjustment ring 88, as will be discussed hereafter.

It is noted that any number of vane lever configurations may include any of the above vane lever opening 44 configurations without departing from the spirit and scope of the invention.

Figure 10:
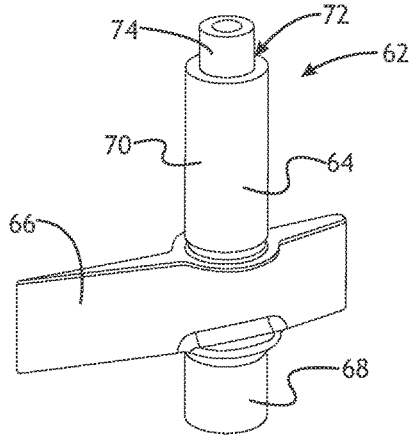
FIG. 10 illustrates a perspective view of a vane component according to a number of variations.
Figure 11:
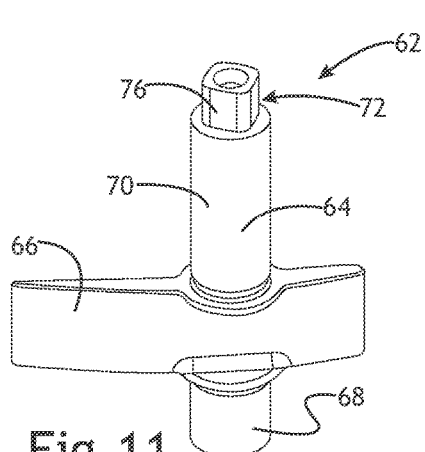
FIG. 11 illustrates a perspective view of a vane component according to a number of variations.
Figure 20:
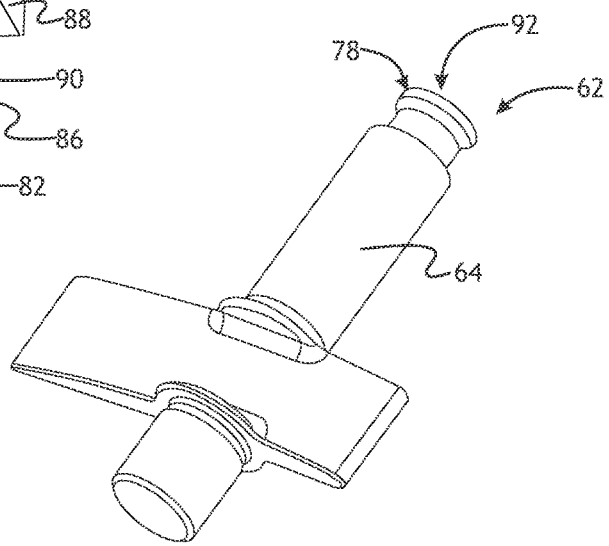
FIG. 20 illustrates a perspective view of a vane component according to a number of variations.
Figure 21:
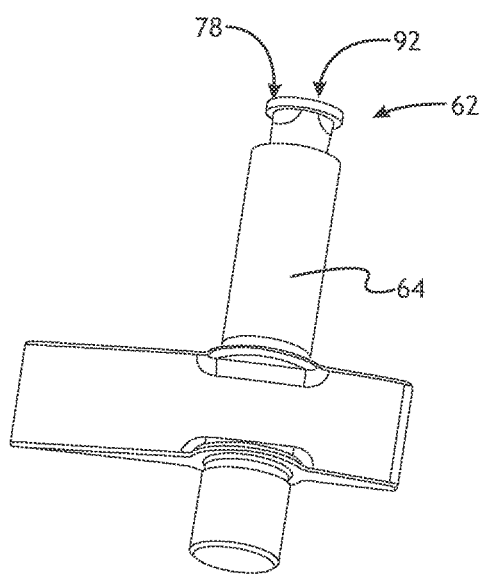
FIG. 21 illustrates a perspective view of a vane component according to a number of variations.

Referring to FIGS. 10-11, in a number of variations, a vane component 62 may include a vane 66 and a vane shaft 64. Any number of vane 66 configurations may be used. The vane shaft 64 may extend through the vane 66 so that the vane 66 may rotate around the vane shaft 64. A first portion 68 of the vane shaft 64 may be constructed and arranged to extend within an opening 81 in a lower vane ring 80, as will be discussed hereafter. A second portion 70 of the vane shaft 64 may be constructed and arranged to extend through an opening 83 in an upper vane ring 82, as will be discussed hereafter. In a number of variations, the vane shaft 64 may be cylindrical and may include a shouldered step 72 which may be constructed and arranged to fit within the vane lever opening 44, as will be discussed hereafter. In one variation, the shouldered step 72 may be cylindrical 74, a variation of which is illustrated in FIG. 10, and may be subsequently deformed to conform to a non-circular vane lever opening 44 interface, variations of which are illustrated in FIGS. 20-21. In another variation, the shouldered step 72 may be non-cylindrical 76 to mate with the non-cylindrical shape of the vane lever opening 44, a variation of which is illustrated in FIG. 11, and may be subsequently deformed to conform to the non-circular lever interface.

Figure 13:
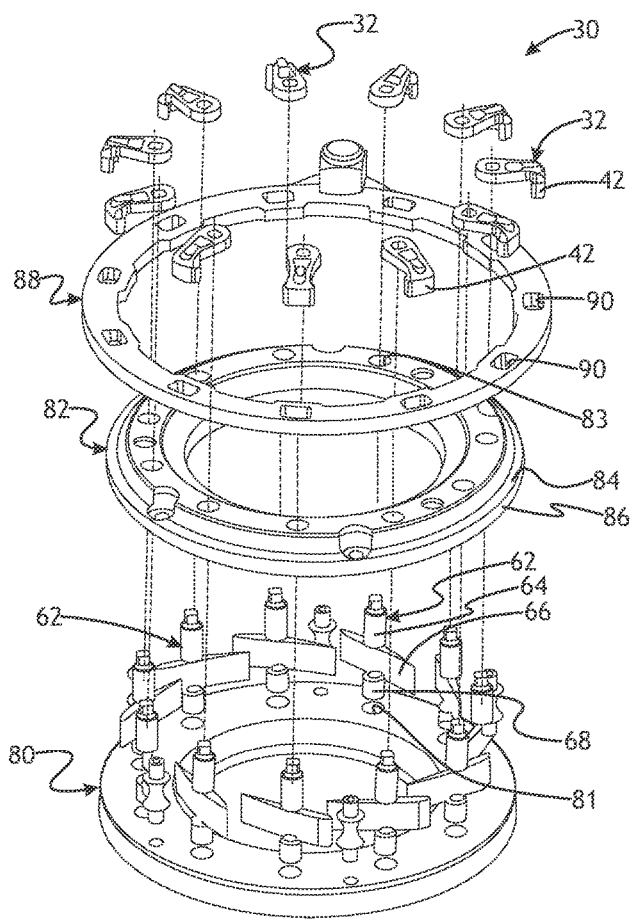
FIG. 13 illustrates an exploded view of a vane pack assembly according to a number of variations.

Referring to FIGS. 13-14, in a number of variations, a plurality of vane components 62 may be spaced circumferentially between the lower vane ring 80 and the upper vane ring 82 so that the vanes 66 are positioned between the lower vane ring 80 and the upper vane ring 82 and so that the shouldered step 72 extends above the upper vane ring 82. In a number of variations, the upper vane ring 82 may include a stepped portion 84 which may extend around the outer perimeter 86 of the upper vane ring 82 and may be constructed and arranged to accommodate a portion of an adjustment ring 88.

Figure 16:
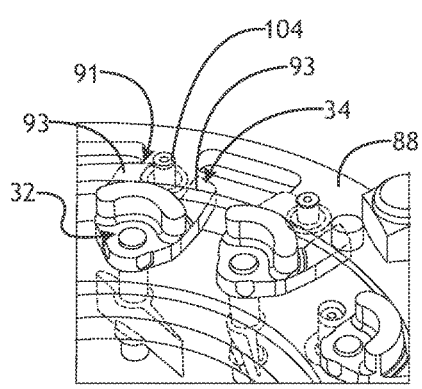
FIG. 16 illustrates a close-up perspective view of a vane pack assembly according to a number of variations.
Figure 17:
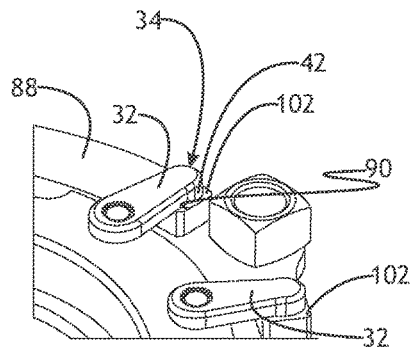
FIG. 17 illustrates a close-up perspective view of a vane pack assembly according to a number of variations.
Figure 18:
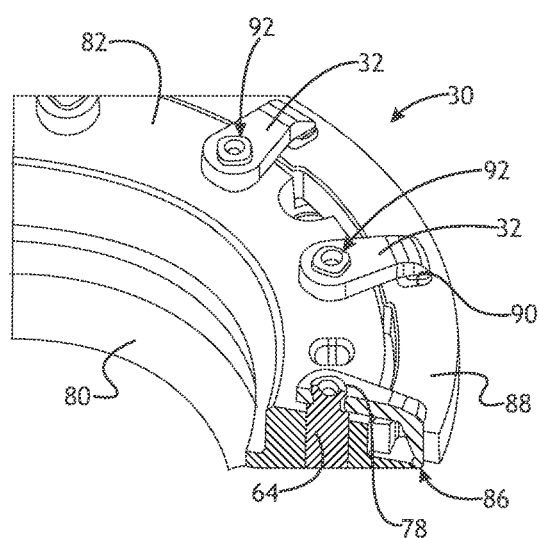
FIG. 18 illustrates a close-up perspective view of a vane pack assembly according to a number of variations.

Referring to FIGS. 15-17, in a number of variations, the first end 34 of the vane lever 32 may be attached to the adjustment ring 88. In one variation, the adjustment ring 88 may include a plurality of cutouts/openings 90 which may be constructed and arranged to accommodate a tab 42 on the vane lever 32, a variation of which is illustrated in FIG. 15, or a block 102 which may be located within the cutout/opening 90 and which may be constructed and arranged to accommodate the tab 42, a variation of which is illustrated in FIG. 17, which may secure the adjustment ring 88 to the upper vane ring 82. In this variation, the vane levers 32 may be positioned onto the vane shafts 64 so that the vane shaft 64 extends through the vane lever openings 44 and so that the lever tabs 42 extend through the cutouts/openings 90 (or blocks 102) on the adjustment ring 88, variations of which are illustrated in FIGS. 15 and 17. In another variation, a vane lever 32 having a fork end 91 may be positioned between the adjustment ring 88 and the upper vane ring 82 so that the first and second protrusions 93 surround a pin 104 which may be riveted or welded to the adjustment ring 88 to attach the vane lever 32 to the adjustment ring 88, a variation of which is illustrated in FIG. 16. In another variation, a combination of pins and rotating blocks may be used to secure the vane lever 32 to the adjustment ring 88. It is noted that any number of attachment methods between the vane lever 32 and the adjustment ring 88 may be used.

Figure 12:
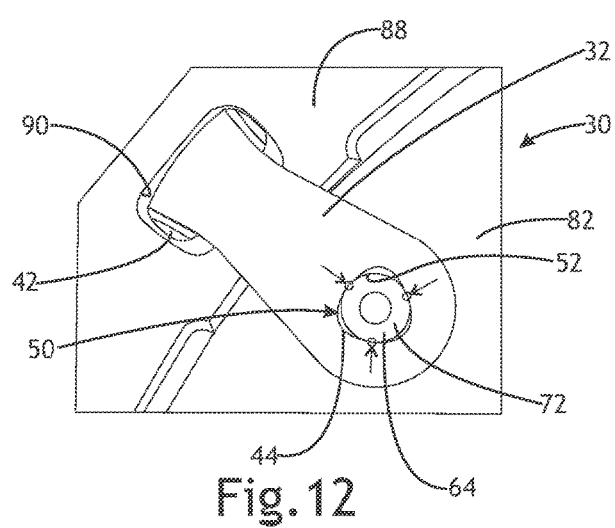
FIG. 12 illustrates a top view of a vane lever positioned onto a vane shaft according to a number of variations.

In one variation, a press-fit may be used for accurate positioning if desired, a variation of which is illustrated in FIG. 12. Press-fitting the vane lever 32 onto the vane shaft 64 may cause irregular radial material deformation at the top edge 50 of the inner surface 52 which may further increase torque capacity before riveting. In a number of variations, external fixturing may be used to accomplish vane lever 32 to vane shaft 64 orientation for assemblies using vane shafts 64 having a cylindrical 74 shouldered step 72. In another variation, vane lever 32 to vane shaft 64 orientation may be accomplished using similar non-cylindrical shapes 46, 76 on the inner surface 52 and the shouldered step 72 of the vane shaft 64, variations of which are illustrated in FIGS. 1 and 11.

Referring to FIGS. 18-21, in a number of variations, the vane shafts 64 may be riveted 92 to the vane levers 32 to secure the vane shafts 64 in place. The riveting of the vane shafts 64 may cause the material of the vane shaft 64 to form into the shape of the inner surface 52 so that the vane shaft 64 contours the shape of the inner surface 52, variations of which are illustrated in FIGS. 20 and 21. The interface between the non-cylindrical inner surface 52 and the dilated vane shaft 78 material may provide additional grip between the vane lever 32 and the vane shaft 64 which may increase the torque capacity of the joint.

Any number of combinations of the above geometries and differing edge conditions at the top of the rivet interface may be used to accommodate the riveting process. It is noted that more irregular or aggressive geometries may be used with advanced riveting processes capable of exaggerated deformations of the vane shaft material.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a vane lever comprising a first end; a second end; a top surface; and a bottom surface; and an opening defined by an inner surface which extends through the top surface and the bottom surface of the second end, and wherein at least a portion of the inner surface comprises a non-cylindrical, multi-lobed shape.

Variation 2 may include a product as set forth in Variation 1 wherein the inner surface transitions from a cylindrical shape at the bottom surface to the non-cylindrical, multi-lobed shape at the top surface.

Variation 3 may include a product as set forth in Variation 1 wherein a top edge of the inner surface is at least one of rounded or includes a groove at each of the lobes Variation 4 may include a product as set forth in Variation 1 wherein a top edge of the inner surface includes a plurality of ridges.

Variation 5 may include a product as set forth in any of Variations 1-4 further comprising a vane component, wherein the vane component comprises a vane rotatably mounted to a vane shaft, wherein the vane shaft includes a stepped portion; and wherein the stepped portion extends through the non-cylindrical, multi-lobed opening of the vane lever and is attached to the vane lever.

Variation 6 may include a product as set forth in Variation 5 wherein the stepped portion is cylindrical.

Variation 7 may include a product as set forth in Variation 5 wherein the stepped portion is non-cylindrical.

Variation 8 may include a product as set forth in any of Variations 5-7 wherein the vane shaft is riveted to the vane lever.

Variation 9 may include a vane pack assembly comprising: an upper vane ring; a lower vane ring; a plurality of vane components each having a vane shaft and a vane interposed between the upper vane ring and the lower vane ring; an adjustment ring surrounding a portion of the upper vane ring having a plurality of openings; and a plurality of vane levers each having a non-cylindrical, multi-lobed opening defined by an inner surface at a second end of the vane lever, wherein the non-cylindrical, multi-lobed opening surrounds a portion of the vane shaft and wherein the first end of the vane lever attaches to the adjustment ring.

Variation 10 may include a vane pack assembly as set forth in Variation 9 wherein a portion of the vane shaft is riveted to the vane lever and conforms to the shape of the inner surface.

Variation 11 may include a vane pack assembly as set forth in any of Variations 9-10 wherein the non-cylindrical, multi-lobed opening is at least one of a diamond shape, a square shape, a triangular shape, or other polygon shape.

Variation 12 may include a vane pack assembly as set forth in any of Variations 9-11 wherein the inner surface has at least one of a rounded or a chamfered top edge.

Variation 13 may include a vane pack assembly as set forth in any of Variations 9-11 wherein the inner surface includes a top edge having a groove at each lobe.

Variation 14 may include a vane pack assembly as set forth in any of Variations 9-11 wherein the inner surface includes a top edge having a plurality of ridges.

Variation 15 may include a vane pack assembly as set forth in any of Variations 9-14 where the vane shaft includes a stepped portion which is constructed and arranged to extend within the vane lever opening.

Variation 16 may include a vane pack assembly as set forth in Variation 15 wherein the stepped portion is cylindrical.

Variation 17 may include a vane pack assembly as set forth in Variation 15 wherein the stepped portion is non-cylindrical.

Variation 18 may include a method of joining a vane lever and a vane shaft of a vane pack assembly together comprising: providing a vane lever having a non-cylindrical, multi-lobed opening defined by an inner surface; fitting the vane lever onto a vane shaft; and riveting the vane shaft to the vane lever.

Variation 19 may include a method as set forth in Variation 18 wherein the vane shaft further comprises a stepped portion having a non-cylindrical multi-lobed shape to match the non-cylindrical, multi-lobed opening for orienting the vane lever during assembly.

Variation 20 may include a method as set forth in any of Variations 18-19 wherein a top edge of the inner surface is at least one of rounded or grooved causing the vane shaft to conform to the shape of the inner surface when riveted.

The above description of select variations within the scope of the invention is merely illustrative in nature and, thus, variations or variants thereof are not to be regarded as a departure from the spirit and scope of the invention.

What is claimed is:

1. A product comprising: a vane lever comprising a first end; a second end; a top surface; and a bottom surface; and an opening which extends through the top surface and the bottom surface of the second end, wherein the opening is defined by an inner surface and at least one intervening surface between the inner surface and the top surface, wherein at least a portion of the opening comprises a non-cylindrical, multi-lobed shape; and wherein the intervening surface extends between the top surface and the inner wall at each of the lobes only.

2. The product of claim 1 wherein the intervening surface is at least one of rounded, chamfered, grooved, or a plurality of ridges.

3. The product of claim 1 further comprising a vane component, wherein the vane component comprises a vane rotatably mounted to a vane shaft, wherein the vane shaft includes a stepped portion; and wherein the stepped portion extends through the non-cylindrical, multi-lobed opening of the vane lever and is attached to the vane lever.

4. The product of claim 3 wherein the stepped portion is cylindrical.

5. The product of claim 3 wherein the stepped portion is non-cylindrical.

6. The product of claim 3 wherein the vane shaft is riveted to the vane lever.

7. A vane pack assembly comprising:
an upper vane ring;
a lower vane ring;
a plurality of vane components each having a vane shaft and a vane interposed between the upper vane ring and the lower vane ring;
an adjustment ring surrounding a portion of the upper vane ring having a plurality of openings; and
a plurality of vane levers each having a non-cylindrical, multi-lobed opening which extends between a top surface and a bottom surface at a second end of the vane lever, wherein the non-cylindrical, multi-lobed opening is defined by an inner surface and at least one intervening surface between the inner surface and the top surface of the vane lever, wherein the non-cylindrical, multi-lobed opening surrounds a portion of the vane shaft and wherein a first end of the vane lever attaches to adjustment ring; and the intervening surface extends between the inner surface and the top surface at each of the lobes only.

8. The vane pack assembly of claim 7 wherein the non-cylindrical, multi-lobed opening is at least one of a diamond shape, a square shape, a triangular shape, or other polygon shape.

9. The vane pack assembly of claim 7 wherein the intervening surface is at least one of rounded, chamfered, ridged, or grooved.

10. The vane pack assembly of claim 7 wherein the intervening surface is a plurality of ridges.

11. The vane pack assembly of claim 7 where the vane shaft includes a stepped portion which is constructed and arranged to extend within the vane lever opening.

12. The vane pack assembly of claim 11 wherein the stepped portion is cylindrical.

13. The vane pack assembly of claim 11 wherein the stepped portion is non-cylindrical.

14. A method of joining a vane lever and a vane shaft of a vane pack assembly together comprising: providing a vane lever having a non-cylindrical, multi-lobed opening defined by an inner surface and at least one intervening surface between a top surface of the vane lever and the inner surface, wherein the at least one intervening surface is at each of the lobes only; fitting the vane lever onto a vane shaft; and riveting the vane shaft to the vane lever.

15. The method of claim 14 wherein the vane shaft further comprises a stepped portion having a non-cylindrical multi-lobed shape to match the non-cylindrical, multi-lobed opening for orienting the vane lever during assembly.

16. A product comprising: a vane lever comprising a first end; a second end; a top surface; and a bottom surface; and an opening which extends through the top surface and the bottom surface of the second end, wherein the opening is defined by an inner surface and at least one intervening surface between the inner surface and the top surface, wherein at least a portion of the opening comprises a non-cylindrical, multi-lobed shape; and wherein the opening transitions from a cylindrical shape at the bottom surface to the non-cylindrical, multi-lobed shape at the top surface.

* * * * *